May 9, 1944.  L. S. CHAMBERS  2,348,192
METHOD FOR EVALUATING FLOW CHARACTERISTICS OF WELLS
Filed Jan. 13, 1940   4 Sheets-Sheet 1

INVENTOR
Lawrence S. Chambers
BY Philip Subkow
ATTORNEY.

May 9, 1944.  L. S. CHAMBERS  2,348,192
METHOD FOR EVALUATING FLOW CHARACTERISTICS OF WELLS
Filed Jan. 13, 1940  4 Sheets-Sheet 4

INVENTOR
Lawrence S. Chambers
BY
Philip Subkow
ATTORNEY.

Patented May 9, 1944

2,348,192

UNITED STATES PATENT OFFICE 2,348,192

METHOD FOR EVALUATING FLOW CHARACTERISTICS OF WELLS

Lawrence S. Chambers, Alhambra, Calif.

Application January 13, 1940, Serial No. 313,719

14 Claims. (Cl. 73—51)

This invention relates to the art of the drilling of bore holes and the production of oil and other fluids from such bore holes. It relates, in its broad aspects, to the determination of the flow characteristics of fluids in bore holes. From the observation of such flow characteristics under various conditions of flow I have been able, by my invention, to drill for and finish bore holes and produce oil or other fluids from bore holes by controlled and scientifically directed methods. Oil wells may be drilled and oil produced in the most efficient and economical manner by using my invention.

Devices have heretofore been suggested for the indication of flow in oil wells. Such devices have been incapable of giving information as to the flow characteristics and rates of flow of fluid in an oil well, and particularly have been incapable of recording flows or flow characteristics to give information as to such flow characteristics at any given point in the well.

Because I have been able to devise a most efficient and accurate method for determining and recording the flow characteristics, rates of flow and dynamic heads incident to flow of oil and other fluid in bore holes at various datum levels in the well, I have been able to devise methods for the drilling and production of oil employing such information, as will be more fully hereinafter disclosed.

One of the important advantages of my method is that it permits the determination of the rate of flow of fluid at any given cross-sectional area in the well. It therefore is possible to plot with great accuracy the distribution of fluid velocities throughout the whole length of the bore hole to give the absolute velocity of the fluids at any given plane in the bore hole.

As is well known, oil is produced from permeable sands which contain oil. The forces which drive oil into a bore hole are gas dissolved with the oil or existing as an independent gas body which acts, because of its pressure, to drive the oil into the bore hole. The hydrostatic pressure of the oil or hydrostatic pressure of water which exists as a body surrounding the peripheries of the body of oil forming the oil pool is an additional driving force. Frequently all four forces drive the oil to the oil well. The driving pressure, which may be the sum of all the pressures existing around the face of the sand, delivering the oil into an oil well, is known as the formation pressure. The oil under this formation pressure, enters into the well and under the influence of this formation pressure and the expanding force of the gas in the well, the oil is lifted to the surface. It will be observed that the formation pressure will deliver oil into the well from the sand only when this formation pressure is greater than the back pressure of the well exerted at the producing face. It is frequently the case that the sand body is not uniform in characteristic from the top to the bottom of the sand body. The resistance to flow due to density of packing will change. Oil flow rates vary as the permeability of the sand changes, and therefore the rate of delivery of oil from various parts of the sands will be different. The more permeable portions deliver more oil than the less permeable portions against the back pressure existing against the sand face. Again, oil wells may produce oil from a number of different sands all of which have different formation pressures and different permeabilities, that is, resistance to flow. Additionally complicating the problem of oil production is the fact that different sands and different portions of the same sand will have different resistances to flow at different rates of flow of oil. Since the rates of flow of oil from the sand into the well is dependent upon the back pressure exerted upon the sands, it will be seen that since all sands and all portions of the sands deliver into the same bore hole but at different levels in the bore hole, the problem of determining the proper method of completing the well and producing the well becomes enormously complicated. In fact, sands which are productive at one back pressure may, if the back pressure is increased, actually become thief sands, that is, the back pressure may become greater than the formation pressure of that particular sand, and oil or other fluid producing from other sands or other portions of the sand may actually be absorbed or delivered into these thief sands.

Because I have been able to devise methods for determining the rate of flow of fluid existing in an oil well at various levels of an oil well, I have been able to devise methods for determining the rate of delivery of oil into an oil well at various back pressures. I have been able to determine the delivery of oil or other fluid from various portions of an oil sand at various back pressures. I have been able to determine the production of oil from the various sands in an oil well at various back pressures, and from such information I have been able to determine the back pressure conditions for various portions of an oil sand and various oil sands which will give maximum productivity of each sand.

The optimum condition of production of oil in an oil well will be, if the objective is to produce the largest amount of oil at the least cost, to produce oil at such rates of flow that the decline of production and the intrusion of edge water should be uniform as between all portions of the producing horizons producing into the well. If oil is produced at the maximum rate of production, that is, at the lowest attainable back pressure, sands of the lowest formation pressure will be depleted most quickly, since inherently they contain the smallest proportion of deliverable oil and edge water will be delivered into the well long before the other producing horizons have been depleted. It therefore may be desirable either to produce the well so as to prolong the time before edge water enters or to blank off these producing horizons or to produce together horizons of the same characteristics by blanking off the horizons which have different flow characteristics and to produce such horizons from another well in the same pool.

Because I am able to determine the rate of delivery of oil at various levels and therefore to determine the delivery of oil into the well by various producing horizons and various parts of the producing horizons, I am able by this method of segregation to cause a maximum delivery of oil to prolong the life of the well.

Since we are able to determine the rate of delivery of oil from various sands at various back pressures, we are able to determine the back pressure at which no flow is obtainable. Since this is equal to the formation pressure of the well, such sands will become thief sands if a greater back pressure is exerted on them. The sands which are thief sands at the back pressure employed in the well for maximum productivity, may therefore be blanked off or the well operated at a back pressure where such sands will not be thief sands.

Not only can the well be finished properly, as heretofore described, but also the well can be produced at maximum efficiency. Thus a well which has already been completed may be explored by the methods herein described. The productivity of the well at various back pressures can be determined. By measuring the rates of delivery of oil into an oil well at a point above the highest producing horizon and by varying the back pressure on the producing horizons, we may determine the rates of production which can be obtained at such various back pressures. We may therefore plot a curve relating the rate of flow of oil in the oil well at varying back pressures. It has been conventional in a pumping well to define the maximum possible productivity of a well, that is, its potential, as the production at zero back pressure on the producing face of the well, assuming this face to be at the mean producing level. By extrapolating the back pressure to zero we would obtain the production of oil at zero back pressure. This is known as the "potential" of the well.

But since such wells rarely produce from a plane, but from bodies of sand having thickness and from bodies of sand of varying permeability, and frequently from several such bodies, the maximum productivity of the well so defined is purely a fiction. What should be determined is the variation in productivity of the various sands and various portions thereof under various back pressures at the point of measurement.

I therefore determine the flow of oil at various datum levels across the face of the various sands, if desired with the simultaneous measurement of the back pressure and repeat at these various datum levels at various back pressures. I can therefore plot a series of curves which will give the rate of delivery of oil at various back pressures at various datum levels, and by extrapolating the curves to zero back pressure at each datum level we will obtain the theoretical maximum productivity of each sand and the sum of such productivities at zero back pressure will be the absolute theoretical productivity. But also we may follow the actual production at various back pressures and obtain not only the theoretical but the practical maximum productivity of the well by adding up the maximum productivity of the sand practically attainable at the lowest back pressure at which maximum production will be obtained from each sand.

Such information is important, since such a curve would give the productivity of each sand and each level of each body of sand at various back pressures, and since the position of the body of sand is known and since the back pressure at each level is known, we will be able to select a casing head pressure in a flowing well and a casing head pressure in a pumping well which would give us the maximum obtainable production.

The information thus obtained also permits of a more accurate appraisal of the total oil reserves in any pool. By measuring the flow characteristics in one or a number of wells in a producing horizon, knowing the variation in thickness of the various sands, we are able to obtain an estimate of the total oil deliverable from the oil pool. At the present time the only way available is to obtain the permeability of core samples and to assume that the same formation pressure operates throughout the whole body of an individual sand, and to estimate, therefore, the production capacities of the sand. Since we would be able to determine the actual production capacities of a sand and various portions of each sand, under actual practical conditions of production, a much more accurate picture of the total oil producing capacities of a sand can be obtained.

In drilling wells it is frequently desired to know whether a sand which has been penetrated can produce oil and if so how much oil can be produced. At the present time the only method available is to introduce a sampling device known as a formation tester, which is essentially joints of tubing carrying a packer and carrying a valve at the bottom of the tubing. The oil well is drilled specially with a special hole. The tubing is set on the packer, the valve opened and fluid below the packer enters the tubing and the valve is again shut off and the whole withdrawn. This method has proven moderately satisfactory, but is costly in time and in labor, and frequently inaccurate.

Because I am able to determine the flow in an oil well by my instrument, it is possible for me to lower this instrument into the drilling fluid and then by reducing the level of the mud in the well, and thus reducing the back pressure, to determine the rate of flow of fluid from a sand into the well at various back pressures. I am therefore able to tell not only whether an oil sand is producing, but also the amount of production which will be obtained at various controlled back pressures when the well is finished.

It is an object of my invention to locate the position of various producing horizons in a bore hole by measuring the flow of fluid in a bore hole at various levels in the bore hole.

It is a further object of this invention to measure the flow of fluid at various levels in a bore hole and from such measurements to evaluate the relative contributions of various portions of the bore hole to the flowing fluid in said bore hole.

It is a further object of this invention to determine the production of a well at various pressures in the well by measuring the rate of flow of fluid in the well at various pressures.

It is a further object of this invention to determine the pressure at which various sands and portions of sands producing into a well will cease to produce oil, that is, to determine their formation pressures.

It is a further object of this invention to determine the flow characteristics of a well producing under its own pressure and also when producing by means of a pump.

It is a further object of this invention to produce a well at its optimum condition of production by evaluating the flow characteristics of the oil well.

My invention will be better understood by reference to the drawings, of which.

Figures 1, 2, 3, 4, 5, 6, 8:
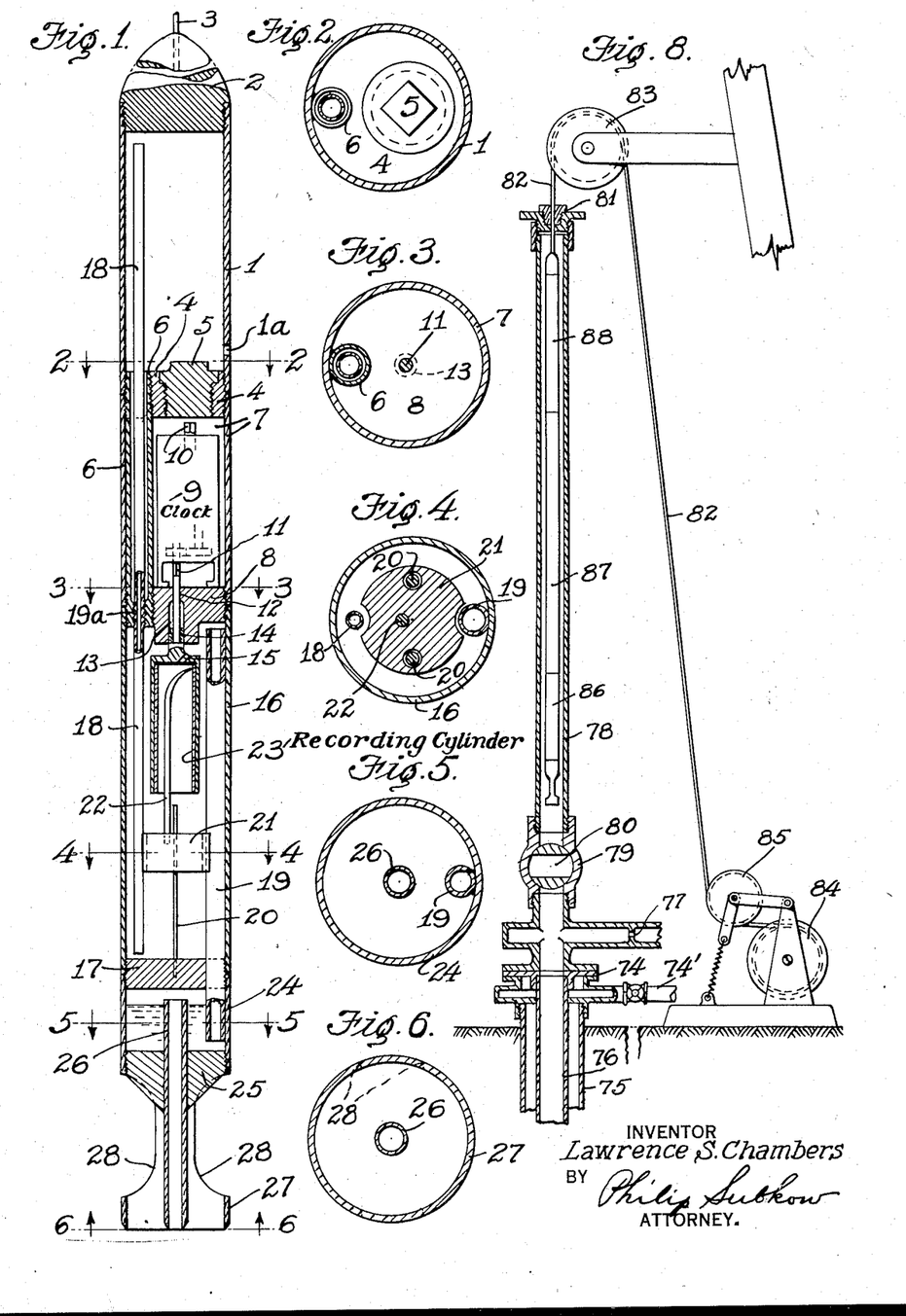
Fig. 1 is a vertical sectional view of my instrument which is also shown positioned in the well in Figs. 8, 9 and 11.
Fig. 2 is a cross section taken at line 2—2 of Fig. 1.
Fig. 3 is a cross section taken at line 3—3 of Fig. 1.
Fig. 4 is a cross section taken at line 4—4 of Fig. 1.
Fig. 5 is a cross section taken at line 5—5 of Fig. 1.
Fig. 6 is an end view in cross section.
Fig. 8 shows an assembly of the upper portion or casing head of the well showing the manner of introduction and running of the instrument shown in Fig. 1.

In Fig. 1, the hydrostatic head transmitting chamber 1 is provided with a plug 2 which carries the line 3. Chamber 1 is also threaded at its lower end into the packing ring 4. The packing ring 4 is closed by a plug 5. The packing ring 4 is provided with an externally threaded tubular passageway 6 which will be further described. This tubular passageway is welded to, threaded in, or otherwise tightly fitted in the packing ring 4 so as to separate clock chamber 7 from the rest of the unit. The clock chamber 7 is also screwed on the packing ring 4 and on the separating plug 8. The tubular passageway 6 is screwed into or otherwise secured to the plug 8 so that the internal portion of the tubular passageway is separated from the internal portion of the clock chamber 7. This clock chamber carries a stem winding clock 9 provided with a stem winder 10 and driving a drive shaft 11. The rotating drive shaft passes through a drilled hole 12 in plug 8 and through the enlarged opening 13. This enlarged opening carries a packer 14. The spindle 11 rotates the cylindrical chart holder 23, provided with a vent 15 as will be further described. The recording chamber 16 is threaded at its upper end and screwed onto the plug 8 and the lower portion onto the separating plug 17. The hydrostatic pressure transmitting tube 18 is screwed into the interior of the tube 6 by means of threads 19a, so that the chamber 16 is separated from chamber 7 and communicates with chamber 1. Dynamic pressure transmitting tube 19 is welded into the separating plug 17. This separating plug carries guides 20 on which travels the float 21. The float is attached to the stylus 22 which is in contact with the chart positioned on the interior of the recording cylinder 23. The trap chamber 24 is screwed at its upper portion to the plug 17 and is sealed at its lower end by plug 25 which carries an impact tube 26. The impact tube is protected by the tubular member 27 carrying cut out portions 28. It will be seen that chamber 1 is separated from all the rest of the chambers and communicates with chamber 16 via pressure transmitting tube 18 which extends from the upper portion of chamber 1 to the lower portion of chamber 16. Chamber 16 is a well into which tube 18 depends. The tubular impact tube 26 extends to the top of trap chamber 24 communicating with the space in the upper portion of the well.

Figures 7, 9:
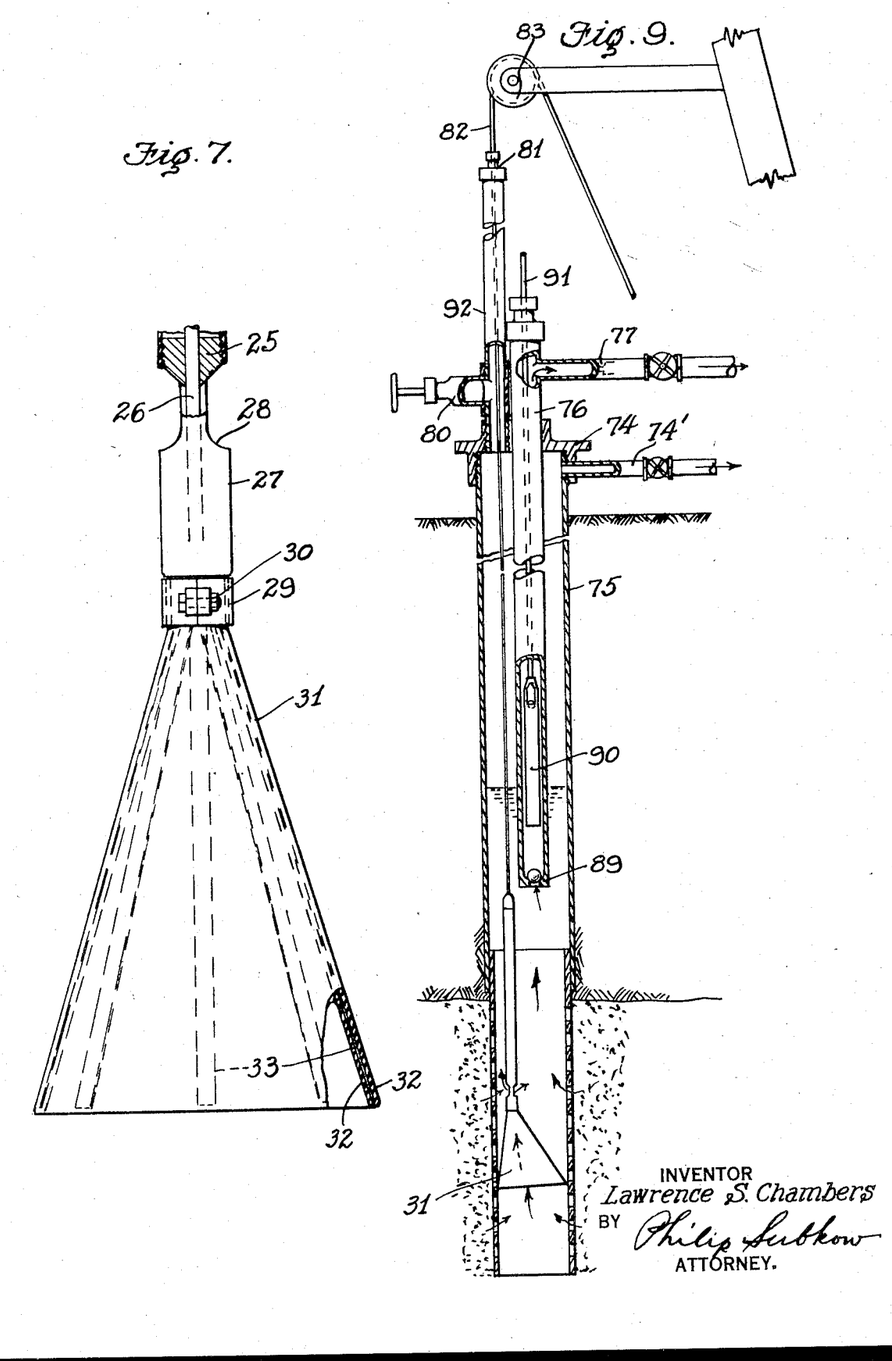
Fig. 7 shows an adaptation of the terminal end of the instrument.
Fig. 9 shows an apparatus and manner of introduction and running of the instrument in a pumping well.

Instead of employing the tubular member impact tube assembly carried by plug 25, we may employ instead, the tubular impact assembly shown in Fig. 7. Thus, the plug 25 and its assembly is unscrewed and in place thereof the unit of Fig. 7 is screwed. This unit consists of the impact tube 26 and the plug 25. This plug carries a tubular member 27 of substantial length. The impact tube 26 extends a substantial distance into the tube 27. The cut out portions 28 are provided similarly to those in Fig. 1. The lower portion of the flow tube 27 carries a flow collector packer 31 which is held to tube 27 by the clamping ring 29 and bolt and nut 30. This flow collector consists of a flexible funnel shaped member of considerable length made of canvas or artificial rubber or other material not affected by oil and is composed of layers 32 and carried between the plies are flat spring members 33. Cup-shaped packers of such character are well known in the oil industry and will be recognized by those skilled in the art.

The assembly and operation of the instrument described in Fig. 1 is as follows:

The instrument is disassembled by unscrewing chamber 1 from plug 4 and chamber 16 is unscrewed from plug 8. The chamber 16 is empty and the float 21 rests on separating plug 17 with the tip of the stylus at the bottom of the recording cylinder 23. A recording chart is placed inside the recording cylinder 23 so that the lines marking the velocity units run around the cylinder (see Fig. 12). Mercury is introduced into the well chamber 16 in amount to raise the float until it touches the zero velocity line near the top of the chart. The plug 8 is screwed into chamber 16 and the clock is wound and set on plug 8 so as to connect spindle 11 to the clock mechanism.

The clock shaft is in driving connection with clock 9 in such manner that it may be either connected or disconnected by lifting the clock or fitting the clock in its place. Chamber 7 having been connected to the separating plug 8, the balancing tube 18 is next inserted through the tube 6 and screwed into place at 19a. The chamber 1 to which has been connected the plug 2 is then inserted over the tube 18 and screwed in place. Water or other fluid, then introduced through the equalizing vent 1a, fills chamber 1 and is circulated down tube 18 through the body of mercury at such rate as not to disturb the float materially. The water or other light fluid rises through the mercury and collects above the mercury in chamber 16 until it overflows tube 19, whereupon it descends through tube 19 and collects in chamber 24 until it overflows tube 26. The mercury will stand in tube 18 and in tube 19, together forming a U tube. Water will be floating on the mercury. In chamber 1 the level will be at the top of tube 18, in chamber 16 at the top of tube 19 and in chamber 24 at the top of tube 26.

Since the end of tubular member 18 is in close proximity to the plug 2 and since the end of tube 19 is in close proximity to the plug 8, and since the end of the impact tube 26 is in close proximity to the plug 17, it will be seen that very little air space is provided at the top of the various chambers 1, 16 and 24. When the tube 1 is inserted into an oil well or other flow line in which the direction of flow is parallel to the tube, there will be exerted through opening 1a the hydrostatic pressure of the fluid which will, if it is above atmospheric, raise the fluid level in 1 to compress the gas space above the fluid level and exert in the balancing tube a downward pressure equal to the hydrostatic head. This hydrostatic head will be exerted upon the surface of the mercury inside this U-tube to depress it. Contrary to this force, there will be exerted through the impact tube 26 the dynamic pressure of the fluid, that is, substantially the same hydrostatic head plus the velocity head or flow head of the fluid passing the impact tube. This will be exerted as a pressure through tube 26 and tube 19 to the space above the mercury in the well to cause a compression of the gas in chamber 24. The pressure will be transmitted through the fluid in chamber 24 through the balancing tube 19 to cause a compression of the gas in chamber 16, and the pressure transmitted through the fluid in chamber 16 to the surface of the mercury. What we have, therefore, is essentially a U-tube in chamber 16. The position of the mercury level, to wit the float, will be dependent upon the difference between the static head exerted through the opening 1a and the static plus velocity head which is exerted through the tube 26. The mercury level in 16 will be depressed and the float will fall. The rotation of the chart by the clock mechanism will cause a scratch to be formed on the chart corresponding to the position of the float. Since the static heads are substantially the same, we will have recorded by the position of the float, the velocity head or flowing head of the fluid. As is well known, the velocity of flow may be determined if the cross-sectional area of the conduit is known.

As will be observed, the trap chamber 24 will separate the fluid introduced under pressure, and which will be introduced through impact tube 26 to create the impact head. The fluid in chamber 1 and in connecting tube 18 will separate the mechanism from the fluid which enters through 1a to create the static head. Since it will be observed the cylinder 23 is provided with a vent 15, the pressures on both sides of the recording cylinder are the same.

In order to obtain a record under water, a thin sheet of aluminum may be employed, as is common in many subsurface instruments, and the scratches formed on the aluminum may be easily read with a chart measuring microscope commonly in use with subsurface pressure bomb measurements in oil wells. Other methods of recording the position of the stylus will be obvious to those skilled in the art. Thus the aluminum or other chart material may be covered with lamp black by means of a water insoluble glue.

Instead of using mercury and water we may use water as the heavy fluid in place of mercury and use oil in the place of water. This will increase the sensitivity of the instrument. Or we may employ an organic liquid in place of mercury and use water as the light liquid. Such organic liquids should have a relatively high boiling point, at least as high as water, be insoluble in water, and have a specific gravity more than water. The selection of such liquid can be made by reference to any standard table of the properties of organic compounds.

The instrument is calibrated by testing fluid flowing at known velocities and the corresponding markings on the chart thus evaluated directly in flow. It may also be calibrated by exerting known pressures on the impact and balancing tubes and the scratches or marking will then be calibrated to give known differences in pressure, that is, be evaluated as velocity head, from which flow velocities can be calculated by well known methods.

The instrument hereinabove described is a self-recording instrument, and if positioned in a well wherein the flow is varying, or if it is to be used in an oil well at various levels, the chart which is rotated at a uniform rate of time will indicate the flow at such various units of time, as will be more fully described in the method of employing the instrument, described hereinbelow.

Fig. 8 shows the manner in which this instrument is introduced into a well. The casing head 74 carrying a valved gas take-off line 74' as is conventional, is connected to the casing 75 and also carries the tube 76. The tube 76 is connected to a side take-off which has an adjustable bean or valve 77. The tubing is also connected to a lubricator 78 which is connected to the tubing by plug valve 79 having full hole opening 80. The lubricator is closed by a packing head 81 through which passes a wire line 82, which is threaded over a pulley 83 and onto a reel 84. Tension is maintained in the line by tension pulley 85. Connected to the line is the instrument 86, a sinker bar 87 which is merely a weight, and if desired a pressure bomb and thermometer which may be of conventional design 88. The reel 84 is of a type commonly used in oil fields and will record the depth to which the instrument has been passed by recording the amount of line unreeled. When the unit has been assembled as shown in Fig. 8, valve 79 is opened and the instrument is then passed through the valve plug 79.

Figures 10, 11:
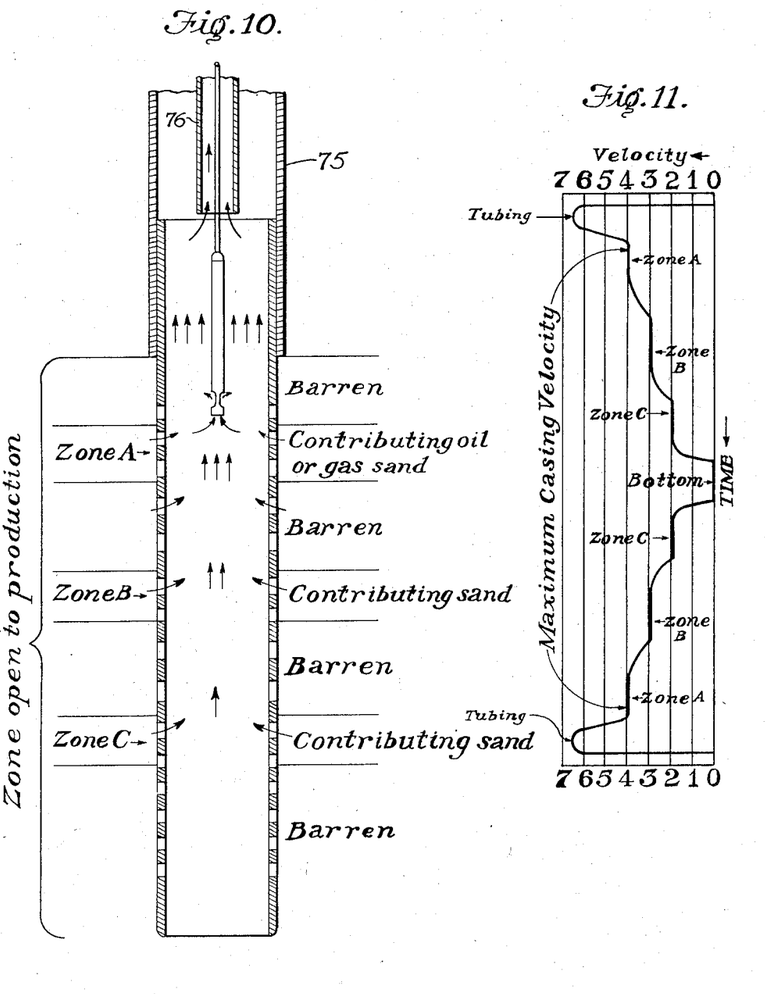
Fig. 10 shows the apparatus for introduction of the instrument in a flowing well, flowing from a number of producing horizons. While the casing head assembly is not shown in this figure, it is shown in Fig. 9.
Fig. 11 shows the chart showing the recording of flow characteristics of various contributing sands tested in Fig. 10.

As shown in Fig. 10, the instrument is lowered to below the tubing 76 into the casing 75. As is here illustrated, the casing 75 penetrates a series of contributing oil or gas sands indicated at zones A, B and C. If the instrument employed is one which is self-recording, as indicated in Fig. 1, time has been counted and recorded from the time the instrument is assembled and the clock 9 has started, until the time when the instrument is run through the tubing. When it has passed out of the bottom of the tubing, whose depth is known, the instrument is stopped. The full velocity of the fluid in the casing is then recorded by the instrument. The instrument is then lowered in stages and is stopped at successive depths, to permit readings to be taken at such successive depths. Sufficient time is given at each depth to permit equilibrium to be established and a correct reading of flow obtained. Such flow is disturbed by the lowering of the instrument and also the rate of descent or ascent of the instrument may give a false indication of flow. If the instrument is introduced as shown in Figs. 8 and 11 and has attached to it the attachment shown in Fig. 7, since the diameter of the tube 27 is known, the scratches may be interpreted in terms of actual volume flow.

The instrument of Fig. 1, where it is employed in wells wherein the lowest producing horizon is above the bottom of the hole, the instrument may be lowered below the lowest producing horizon and stopped. The instrument at that point will be registering zero flow. This will constitute a calibration of the instrument under the conditions existing in the well, and in the case of the instrument of Fig. 1 the record made at the time when the instrument is at the point of zero flow will constitute the zero line from which all flow velocities will be measured on the chart. A further check upon the instrument is also obtained by giving due observance to the fact that the sum of the velocities measured for each of the zones when measured from the zero point established by the above calibration should equal the total velocity measured at the point above the top producing zone.

The operations here described in connection with Figs. 8 and 10 are operations relating to a flowing well flowing under the formation pressures of the various sands. Fig. 9 illustrates the determination of flow velocities in a pumping well. In Fig. 9 the casing 75 is closed by a casing head 74 in which a tubing 76 is carried, in which tubing an oil take off is provided. The tubing carries at the bottom a conventional pumping unit composed of a standing valve 89 and a pump piston 90. The pump piston is actuated by sucker rods 91 as is conventional. In the casing head 74 is positioned the lubricator 92 controlled by a valve 80. This valve may be a slide valve instead of a plug valve, as shown in Fig. 8. The lubricator is closed by a packer 81 as previously described. The instrument, as shown in Fig. 9, carries the flow packer and tubular attachment of Fig. 7. As has been previously described, the flow of the fluid will distend the packer so that it contacts the walls of the well, the irregular position being possible by reason of the flexibility of the device. The total flow is collected by this funnel, directed through tube 27 to impact tube 26 and through the openings 28 and into the pump. The device therefore measures the total flow into the well.

To illustrate the recording of fluid flow in a flowing well, the following description is given by way of example without intention of limiting the invention.

If the well to be tested is a new well it will be desirable to clean the well to remove any material which has entered the well from the formation as may occur in caving formations. While not an essential for the operation of this method, if desired, removable liners which have been fully perforated or drillable liners such as aluminum alloy liners which have been fully perforated may be set. In a flowing well it will usually not be necessary to take these precautions. The tubing, however, should be raised above the highest producing horizon, at a sufficient distance so that a uniform velocity of fluid flow may be attained in the casing or well bore, undisturbed by the eddy currents occasioned by the entrance velocities occurring when the fluid enters the tubing. The casing head should be provided with a variable bean or valve shown at 77 and the casing head 74 as shown in Fig. 8 should also be provided with a gas take-off line from the top of the casing. The back pressure valve in the gas take-off should be capable of maintaining a constant gas pressure at the casing head. With valve 79 closed, see Fig. 8, packer head 81 is removed from the lubricator. The flow meter 86 preferably carrying the attachment of Fig. 7 at the end thereof, is connected to a sinker bar 87 of sufficient length and weight to cause a sinking of the instrument in the well against the upward velocity of flow. This sinker bar may have centering wings attached thereto capable of centering the instrument in the tubing and in the casing when it passes out of the tubing as shown in Fig. 11. Such centering wings are well known in this art, and are, for example, extendable spring members which contact the walls and are collapsed when the instrument is drawn into the tubing. The pressure bomb 88, of well known construction, may be attached. Such a pressure bomb will, like the instrument shown in Fig. 1, record the static pressure at the same time the instrument is recording velocity head. Since both these instruments are actuated by a time clock, both time clocks being set at the same time, corresponding indices of their respective stylus will indicate both the dynamic and static head occurring at the said time.

Reference may be had to the publication of the Department of the Interior, United States Bureau of Mines, Report of Investigation entitled "Bureau of Mines Multiple Diaphragm Recording Subsurface Pressure Gauge" by W. B. Berwald et al., being a report of investigation 3291, dated Nov. 1935 and to the report made to the sixth midyear meeting of the American Petroleum Institute at Oklahoma, May 15, 1936, entitled "Precision Gauge for Sub-surface Pressure Measurements" by Paul G. Exline.

If the instrument is that shown in Fig. 1, it is assembled as described, the clock wound, and time immediately recorded. The same is done for the clock of the pressure bomb.

The packer 81 is then attached to the head of the lubricator, valve 79 is opened, and the instrument is permitted to descend until it has passed out of the tube 76. The depth of the tubing in a well is always known. The reel 84 records the length of line which has passed out, and therefore the position of the instrument is always known. The flow may be measured at the surface by collecting the amount of liquid which it is desired to measure, as will be understood by those skilled in the art. The gas pressure at the casing head is maintained constant during this operation.

With these flow conditions adjusted and flow permitted to occur for a period of time to permit the establishment of equilibrium in the well, that is, the attainment of a constant fluid level in the annulus of the casing between the tubing and the casing, the casing head pressure and if desired the position of the fluid level is recorded. The casing head pressure may be determined, as is conventional, by a pressure gauge, and the fluid level by well known sonic methods commonly employed in oil fields. The instrument is lowered until it is clear by several feet of the end of the tubing, preferably at the bottom of the casing where a liner is used, at which time a record of the time is made. The position of this point is known and it therefore will be made a datum level. The instrument is allowed to remain at rest for a period of time. The valve 77 is adjusted to give a desired rate of flow.

The instrument is then again lowered for known distances, keeping a constant record of the time during which the instrument is held stationary at its various positions. This is repeated periodically until the instrument has reached bottom. The instrument may then be withdrawn at the same rate as it was lowered, time being recorded when the instrument reaches the various positions in the well and the time during which it remains at these positions.

When the instrument enters the tubing, it is rapidly withdrawn. The time when the instrument is withdrawn into the lubricator is recorded and the lubricator valve plug 80 is closed and the instrument disassembled, time records being kept all this time. The instrument, if it be that of Fig. 1, is opened by unscrewing chamber 16 and removing the chart. The elapsed time is recorded and compared with the chart reading. In this way the time unit on the chart is established and compared with the time record for various depths. This chart will be as shown in Fig. 11.

It will be seen that the units 0 to 7, right to left, correspond to the linear velocity of the fluid in feet per second. These units have been determined by the calibration of the instrument by immersing it in fluid flow of known velocities as is conventional. Time is measured, increasing downwardly as indicated by the arrow. Since the position of the instrument at all times is known, the record will give the variation in velocity of fluid for various positions of the instrument, that is, at various depths in the well.

Reading this figure, we find that when the instrument was assembled the line indicated zero flow for a period of time, after which it then rose rapidly to a velocity of about 6½ units when it entered the tube 76. The velocity dropped to show a velocity of four units as it discharged from the tubing into the casing. In this case the instrument was run without the attachment of Fig. 7. The velocity of four units being just below the tubing and above all the producing horizons indicates the maximum flow in the casing and is the total production of the well. As the instrument was descending past the various sections of zone A, it failed to record the flow of fluid of the portions of the zone which it had passed and the pressure line for zone A dropped.

There being less flow below the instrument, the pressure dropped until having passed by the contributing sand A, the pressure drops more sharply due to the fact that we now do not have any contribution from zone A and all the contribution is now from zones B and C. This pressure represents three units as shown. The contribution of zone A is therefore equal to one unit.

Again the instrument is lowered and the pressure drops slowly, due to the variations in flow from the various portions of the sand and again drops to that occasioned by the contribution of zone C, that is, two units. The contribution of sand B was therefore one unit. The instrument is again lowered to bottom. Since at the bottom the velocity is zero flow, the line drops to zero. The contribution of zone C was therefore two units. It is kept there for a time and the line indicates zero during that period of time. The instrument is then withdrawn at substantially the same rate, keeping the instrument at substantially the same time at various positions corresponding to those occurring when the instrument descended and the reverse line is drawn. Since the lines are substantially identical it indicates that the instrument is apparently in balance and functions properly, and this constitutes a check on the instrument.

The subsurface pressure bomb which may be run along with the instrument when it is opened will give the subsurface pressures occurring at the various points, as will be recognized by those skilled in this art.

The casing head pressure is then changed, as, for instance, it may be reduced by setting the back pressure valve to maintain a lower or higher back pressure and the well is permitted to produce at this new back pressure for a period of time to re-establish an equilibrium. Casing head pressure and fluid level if desired is again recorded. The instrument is then run again as previously described to make substantially the same record at the new casing head pressure. As previously, the instrument is stopped at the datum plane, that is the bottom of the casing above the perforations of the liner. This may be repeated at various back pressures.

Since the pressure bomb which is run with the instrument gives us the absolute total static pressure occurring at any position at which the record is made, and since the record shown on Fig. 11 taken together with the record made by the reel 84 gives us the absolute position of the various sands, we obtain the total pressure exerted against the individual sands as recorded by the pressure bomb. Knowing the diameter of the casing at these various points, we can convert the velocity units of Fig. 11 into absolute flow in barrels per day or per hour for the whole well, and for each contributing sand, as explained above.

Figure 12:
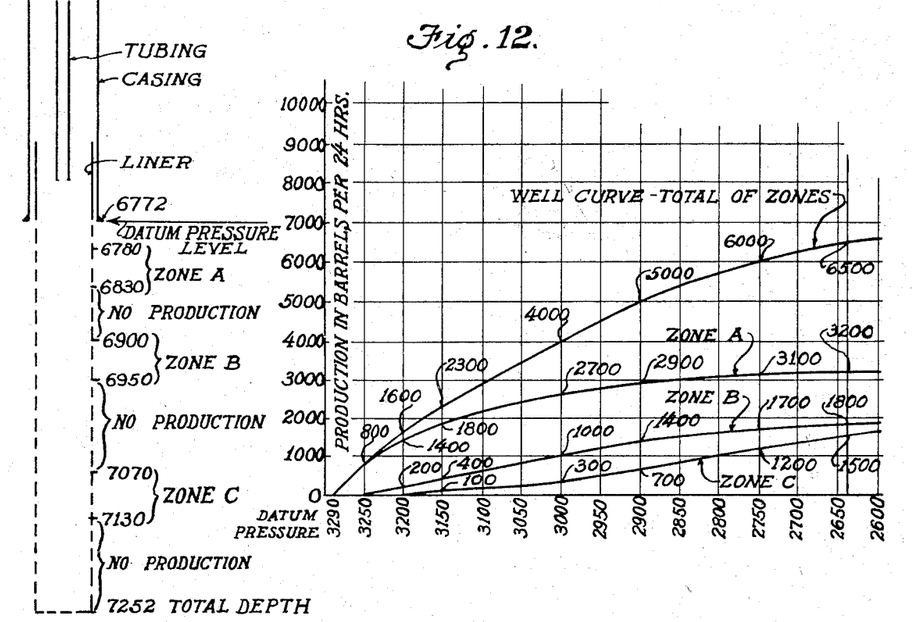
Fig. 12 is a graph showing the contribution of various sands to the total production of a flowing well.

We can plot Fig. 12. In this figure the ordinates are the static pressures existing at the top of the perforated liner as measured by the pressure bomb in each run. Since this is a fixed point and is above the topmost contributing zone, it is a reference level. In the particular well illustrated at Fig. 12 the casing is bottomed at 6772 feet. The liner was perforated from 6783 to the bottom at 7252 feet. The tubing was at 6700 feet.

In the first run the casing head pressure was set and the instrument was run and pressures and flow rates recorded. In the first run the datum subsurface pressure was 3250 pounds, the total production, i. e. the flow at this point was 800 barrels. Zone A contributed all of this flow, zones B and C producing nothing. Apparently the pressure exerted on the formations B and C when the datum pressure is at 3250 pounds, is at least as great as the formation pressures of zones B and C.

The casing head pressure was again adjusted by partially opening the valve in line 74' or changing the bean as the case may be, to give a larger opening, and after allowing the flow to equilibrate the traverse of the well is again made, by positioning the instrument at the same points as in the previous run. In this run the datum subsurface pressure was 3200 pounds and the flow of the well at the datum level was 1600 barrels per day, of which zone A contributed 1400 barrels and zone B 200 barrels, none coming from zone C.

This was repeated for the following datum pressures: 3150 lbs., 3000 lbs., 2900 lbs., 2750 lbs., 2652 lbs. Tabulating the results:

| Sub-surface pressure at datum level, lbs./sq. in. | Total flow of all zones in bbls./day | Contribution of each zone in barrels/day | | |
|---|---|---|---|---|
| | | Zone A | Zone B | Zone C |
| 3,250 | 800 | 800 | 0 | 0 |
| 3,200 | 1,600 | 1,400 | 200 | 0 |
| 3,150 | 2,300 | 1,800 | 400 | 100 |
| 3,000 | 4,000 | 2,700 | 1,000 | 300 |
| 2,900 | 5,000 | 2,900 | 1,400 | 700 |
| 2,750 | 6,000 | 3,100 | 1,700 | 1,200 |
| 2,652 | 6,500 | 3,200 | 1,800 | 1,500 |

Extrapolating each curve we find that the well will cease flowing when the datum pressure is 3290 lbs. This is therefore, at least, the formation pressure of the zone A, i. e. the zone with the highest formation pressure. The extrapolation of the curve of zone A to zero flow also shows that it will stop contributing when the datum pressure is at 3290 pounds. However, the actual pressure on the formation A when it ceases flowing is greater than the datum pressure by the weight of the column of oil and gas in the well between the datum level and the zone A. The mean depth of zone A is 6805 feet, i. e. 33 feet below the datum level. The pressure bomb records show that the oil and gas column weighs .106 lb. per foot, i. e. 3.5 lbs. The formation pressure of zone A is therefore 3293 lbs.

In like manner, we observe by extrapolating the curve for zone B to zero flow that this occurs when the datum subsurface pressure is 3250 pounds. However this mean depth is 153 feet below the datum point. The weight of the column of oil and gas is 16.2 lbs. The formation pressure of this zone is therefore 3266 lbs.

In like manner zone C starts flowing when the datum pressure is at 3200 lbs., as will be seen when the curve of zone C is extrapolated to zero flow. The mean depth of this formation is at 7100 feet. The height of the column of gas and oil is therefore 328 feet, equal to about 35 lbs., and the formation pressure is 3235 lbs. Consequently, zone C will be a thief sand at higher subsurface pressures and zone B will be a thief sand above 3266 lbs. at the formation.

In order to produce from all of the sands, the datum pressure should be carried at at least 35 lbs. less than 3200 lbs., i. e. at about 3165 lbs. At this pressure zone C will contribute about 50 barrels, since there will be half the zone at a lower pressure. Since we are measuring pressure at the mean depth of the zone, zone B will contribute about 300 barrels, zone A about 1750 barrels. The total flow will be about 2100 barrels. By flowing the well at a higher datum subsurface pressure we will lose oil from one formation into the sands of lower formation pressure.

Like information may be obtained upon the pumping well by running the apparatus as illustrated in Fig. 9. The instrument is assembled similarly to that in Fig. 8. In this case it is illustrated together with the flow collector in tubing 27. It is lowered through the lubricator with valve 80 open until it is below the standing valve 89 but above the producing horizons. Casing head pressure being set at a predetermined point by the setting of the constant back pressure gas valve on the casing head, and the variable bean in the flow line 77 being adjusted, the pump is operated at a constant rate for a period of time until the level of the fluid in the annulus standing between the flow tube 76 and the casing has reached an equilibrium. This is obtained usually after several hours pumping, but if desired the position of the fluid level may be determined at various times by well known methods, and the pumping continued until the fluid has reached a stable point. The pumping rate is usually established for several hours before the instrument is run so that the equilibrium will be reached in a relatively short time after the instrument is introduced. After the equilibrium has been reached, the flow is permitted to continue for a period of time at the constant pumping rate.

The instrument is lowered to various levels in the same manner as has been described for flowing wells. The contributions of each sand and portions of sand is determined by the same method as that described for flowing wells.

The experiment is repeated once more for a different production rate. The pump is speeded up and the casing head pressure is reduced and the pumping continued at this new rate and new pressure until a new stable level is obtained. Again the instrument is run and the contributions of each sand determined. This test may be repeated several times.

Figures 13, 14:
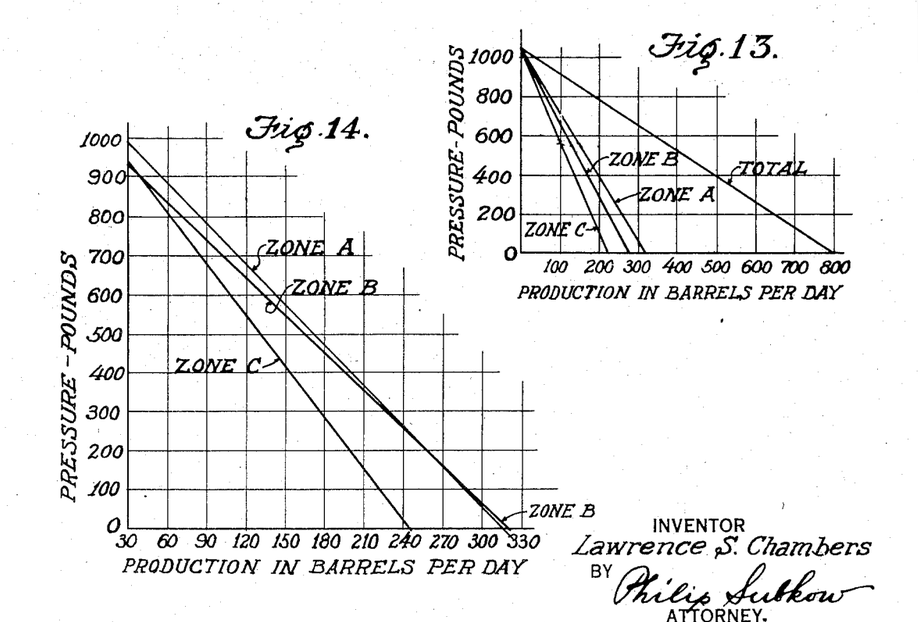
Fig. 13 is a graph showing the contribution of various sands to the production of a pumping well.
Fig. 14 is a graph showing the variation of the contribution of various sands in a pumping well with subsurface pressure exerted upon said sands.

We can plot a series of curves showing the varying contributions of the various sands at varying equilibrium rates of production of the well. This is shown in Figure 13. At zero production from the well, as for instance when the back pressure exerted on the sands is as great as their formation pressures, the production from all the sands will be zero. As the rate of production is increased due to reduced back pressure on the formations, the production of each sand will be increased in the ratio of their producing capacities. The curves show the production measured at each sand and will give the contribution of each sand or portion thereof, as the case may be.

The instrument is lowered until it reaches a position several feet below the entrance of the pump in order to avoid the effect of entrance velocities and turbulence at the standing valve. A good datum level will be the top of the perforations in the liner, since this is known. The instrument is stopped and flow allowed to come to equilibrium. Measurement is made. Traverse is made of the well in the same way as in the case of the flowing well of Fig. 10. The instrument is lowered in stages and allowed to come to rest at various levels, to permit steady flow to be established. Measurement of flow rates are made at the various levels. As in the well of Fig. 10. the total flow in the well at the established pumping rate, and the contributions of the several sands are determined.

For example, the well is pumped at a constant rate with the subsurface pressure at the top of the perforations equal to 640 pounds, the flow above the sands, i. e. total flow, was equal to 300 barrels per day. The flow due to zone A was 120 barrels per day, the flow due to zone B was 100 barrels per day and the flow due to zone C was 80 barrels per day. The production rate is next increased and the pressure decreased by reducing the casing head and speeding up the pump. The pumping at the new rate is then continued at a constant rate until the stable fluid level is attained. At this new production rate the subsurface pressure at the datum level, i. e. the top of the perforations, was measured at 400 pounds and the total flow of the well measured above zone A measured 490 barrels per day. The production due to zone A was 190 barrels per day, the production due to zone B was 170 barrels per day and the production due to zone C was 130 barrels per day.

Drawing curves, Fig. 13, of total production and for each zone and extrapolating them until they intercept the pressure axis, we find that at a pressure of 1040 pounds at the datum level no production can be obtained. At such datum pressure we are in excess of the formation pressures of all the zones. Extrapolating the curves until they intercept the production axis, the abscissa, we find that if the datum pressure is reduced to zero, which is the minimum pressure attainable at this datum level, the well will produce 800 barrels per day and the contribution of zone A will be 310 barrels per day, the contribution of zone B will be 270 barrels per day, and of zone C will be 220 barrels per day.

When the subsurface pressure at the datum level is zero, there is still exerted on the formations A, B and C a back pressure equal to the weight of the column of fluid above the formation, and likewise the actual back pressure upon the formations at every datum subsurface pressure will be equal to that datum subsurface pressure plus the back pressure of the fluid between the datum level and each zone.

Therefore, since we know the position of these formations from the test and since we know the weight of the fluid, since the pressure bomb run with the flow meter records the variation in subsurface pressures with depth, we can replot Fig. 13 as Fig. 14.

In this example, the datum level is at 4700 feet. The mean level of zone A is at 5000 feet. The mean level of zone B is at 5125 feet. The mean level of zone C is at 5225 feet. The record showed that the density of the fluid was .2 lb. per foot. The additional back pressure in excess of datum pressure exerted at the main level of zone A is therefore 60 pounds, and zone B 85 pounds, and zone C 105 pounds. Therefore, when the datum pressure was 640 pounds, the pressure upon zone A was 700 pounds, zone B was 725 pounds and zone C was 745 pounds. When the datum pressure was 400 pounds, zone A had a subsurface pressure of 460 pounds and its production was 190 barrels. Zone B had a subsurface pressure of 485 pounds and its production was 170 barrels. Zone C had a subsurface pressure of 505 pounds and its production was 130 barrels. These curves are plotted in Fig. 14.

Extrapolating these curves until they intercept the zero axis, we find that the maximum production that can be obtained from zone A, if its subsurface pressure is reduced to zero, is 317 barrels, while zone B, if its subsurface pressure is reduced to zero, would produce 320 barrels, and zone C, if its subsurface pressure is reduced to zero, would have a maximum production of 246 barrels. Such maximum production at zero subsurface pressure is defined as the "potential" in oil field terminology. The potentials of the several zones are, therefore, for zone C 246 barrels, for zone B 320 barrels, and for zone A 317 barrels, or 883 barrels as compared with 800 barrels when measured for maximum production at zero subsurface pressure at the datum level. By extrapolating each production curve to zero flow we obtain the back pressure on each formation which would just balance flow. In other words, the formation pressure for zone A is 990 pounds, for zone B it is 930 pounds, and for zone C it is 940 pounds.

Whereas in the previous examples, the pressures were taken at a datum point above the producing horizons, or at the mean producing level of each formation, we may at the same time take the pressure measurements below the producing horizon and evaluate these flows with variations of this pressure known as bottom hole pressure. In this case, when the bottom hole pressure is reduced to zero, the pressures exerted on each producing horizon will be reduced to zero and the production of each formation will be a maximum. The extrapolation of the curves in Fig. 13 and in Fig. 14 will give the potential of each formation. Likewise, instead of evaluating the pressure upon the mean level of each producing horizon, we may either evaluate or measure the subsurface pressure exerted at the bottom of each producing zone, and the evaluation of the production when such pressure is reduced to zero will give the maximum productivity of each zone, or the potential of each zone.

In oil production practice, it is now conventional to prorate production as among all wells in any producing area, if they be pumping wells, in the ratio of their potential. Previous methods for employing evaluations of productivity in which the total production of the well measured at the surface is plotted against various subsurface pressures measured at what is an assumed mean producing level, assumes that the well produces but from one horizon. In other words, curves such as the curve for total production of Fig. 14 are plotted showing the total production measured at the surface as in Fig. 14, using the production as caught at the surface in a tank as a measure of the productivity. As will be observed from what has gone before, because attention has not been given to the individual production of the various sands, the total potential of the well has been under rated. As shown in the case represented by Figs. 14 and 15, this potential is under rated by at least 10%, since the zero pressure should not be measured at an artificial datum point but at a zero pressure upon the deepest formation, in this case zone C. If the zero pressure is exerted at zone C, zones A and B will also be evaluated at zero pressure.

It is to be understood that the foregoing examples are for purposes of illustration and are not to be considered as limiting of the invention. Various changes and modifications may be made therein without departing from the spirit of the appended claims.

I claim:

1. A method of determining the flow characteristics of a flowing well which comprises introducing and lowering a flow meter into said well, flowing said well, maintaining uniform flow of fluid in said well at said flow meter and measuring the volumetric flow of fluid while maintaining such uniform flow, moving said meter in said well to a point vertically disposed in said bore hole from the point of said first mentioned measurement, again maintaining uniform flow of fluid in said well at said flow meter and measuring the volumetric magnitude of flow while maintaining said uniform flow of fluid while making said measurement, and from said measurements determining the flow characteristics of the well.

2. A method of determining the flow characteristics of a well which comprises measuring the rate of flow of fluid in a bore hole at a plurality of points vertically disposed in the bore hole, varying the pressure exerted at each of said points in said bore hole determining said exerted pressures, and measuring the flow at each point at said different pressures.

3. A method of determining the flow characteristics of an oil well which comprises measuring the rate of flow of fluid in a bore hole at one level in said bore hole under a plurality of determined pressures exerted at said level in said bore hole, repeating said measurements at a different level in said bore hole, vertically displaced from said first lever, at a plurality of determined pressures exerted at said second level, and from said measurements determining the variation of flow of fluid in said bore hole at various subsurface pressures.

4. A method for determining the relative contributions of various producing zones in a well which comprises introducing a flow meter into the well, adjusting the casing head pressure to a fixed value and continuing the flow of said well for a period of time until equilibrium conditions have been established, moving the meter in said well and measuring the velocity of flow at various levels in said well, again adjusting the casing head pressure to a new and fixed value and continuing the flow at said new casing head pressure for a period of time until equilibrium flow conditions have been established, moving the meter in said well to measure the velocity of flow at various levels in said well at said new pressure and from said measurements determining the contribution of the various producing zones under various conditions of subsurface pressure.

5. A method for determining the contribution of various producing levels to the production of a well which comprises establishing a constant casing head pressure and flowing the well for a period of time at such pressure until stable flow conditions are established, determining the increments of flow at successive producing levels in said well, again establishing a new casing head pressure and again permitting said well to flow at such different casing head pressure to establish a new stable flow condition in said well, and again measuring the increment of flow at successive levels in said well, and evaluating the effect of subsurface pressure on the production of producing levels in said well.

6. A method for determining the contribution of various producing levels to the production of a well which comprises establishing a constant casing head pressure and flowing the well for a period of time at such pressure until stable flow conditions are established, determining the increment of flow at successive producing levels in said well and the subsurface pressure occurring at said levels during said production, again establishing a new casing head pressure and again permitting said well to flow at such different casing head pressure to establish a new stable flow condition in said well, and again measuring the increments of flow and the subsurface pressure occurring at successive levels, during said production and evaluating the effect of subsurface pressure on the production of producing levels in said well.

7. A method for determining the contribution of various producing levels to the production of a well which comprises establishing a constant casing head pressure and flowing the well for a period of time at such pressure until stable flow conditions are established, determining the increment of flow at successive producing levels in said well, and determining the subsurface pressure at a datum level above said producing levels, again establishing a new casing head pressure and again permitting said well to flow at such different casing head pressure to establish a new stable flow condition in said well, and again determining the increment of flow at successive levels in said well and determining the subsurface pressures at said first-named datum level, establishing a curve showing the variation of said contribution as a function of said subsurface pressure exerted at a fixed datum plane above said producing levels, extrapolating said curve to zero pressure at said datum plane and determining the contribution of said producing levels to the flow of said well when said datum level pressure has been reduced to zero.

8. A method for determining the contribution of various producing levels to the production of a well which comprises establishing a constant casing head pressure and flowing the well for a period of time at such pressure until stable flow conditions are established, determining the increment of flow at successive producing levels in said well, again establishing a new casing head pressure and again permitting said well to flow at such different casing head pressure to establish a new stable flow condition in said well, and again measuring the increment of flow at successive levels in said well, and establishing a curve showing the variation of said contribution as a function of subsurface pressures.

9. A method of determining the producing characteristics of a pumping well which comprises establishing a constant casing head pressure and pumping said well by means of a pump immersed in the well fluid for a period of time to establish a stable fluid level, measuring the rate of flow of fluid occurring in said well at a point above the producing level and below the well pump, again varying the casing head pressure and pumping said well at a different rate of flow to establish a stable fluid level and measuring the flow in the well at the point in said well above the producing level and below the well pump and evaluating the variation in flow in said well with the pressure in said well.

10. A method of evaluating the flow characteristics of a pumping well which comprises establishing a casing head pressure and pumping said well at a given rate of production until a stable fluid level is attained, measuring the rate of flow of fluid in said well at positions in said well opposite the various producing horizons, and also evaluating the back pressure exerted upon said producing horizons at such rate of flow, varying the casing head pressure and establishing a different rate of production from the well to again establish a stable fluid level, measuring the rate of flow of fluid in said well at points opposite the producing levels, and evaluating the subsurface pressure at said levels at said last named rate of flow and from said measurements evaluating the variation of the contribution of said producing levels to the flow in said well at various subsurface pressures exerted upon said formations.

11. A method of evaluating the flow characteristics of a pumping well which comprises establishing a casing head pressure and pumping said well at a given rate of production until a stable fluid level is attained, measuring the rate of flow of fluid in said well at positions in said well opposite the various producing horizons, and also evaluating the back pressure exerted upon said producing horizons at such rate of flow, varying the casing head pressure and establishing a different rate of production from the well to again establish a stable fluid level, measuring the rate of flow of fluid in said well at points opposite the producing levels, and evaluating the subsurface pressure at said levels at said last named rate of flow and from said measurements evaluating the variation of the contribution of said producing levels to the flow in said well at various subsurface pressures exerted upon said formations, and from said evaluation determining the rate of flow in said well when the subsurface pressure on said producing levels has been reduced to zero.

12. A method of evaluating the flow characteristics of a pumping well which comprises establishing a casing head pressure and pumping said well at a given rate of production until a stable fluid level is attained, measuring the rate of flow of fluid in said well at positions in said well opposite the various producing horizons, and also evaluating the back pressure exerted upon said producing horizons at such rate of flow, varying the casing head pressure and establishing a different rate of production from the well to again establish a stable fluid level, measuring the rate of flow of fluid in said well at points opposite the producing levels, and evaluating the subsurface pressure at said levels at said last named rate of flow and from said measurements evaluating the variation of the contribution of said producing levels to the flow in said well at various subsurface pressures exerted upon said formations and from said evaluation determining the formation pressures.

13. A method of determining the flow characteristics of a well, which comprises independently measuring the static pressure existing in said well at the point of measurement and independently measuring the velocity head of the flowing fluid at said point of measurement, repeating said measurement of static pressure and velocity head at another point in said well vertically displaced from said first point, and from said measurements determining the rate of flow of fluid in said well.

14. A method of determining the flow characteristics of a well which comprises introducing into said well a static pressure measuring device and a velocity head measuring device, lowering said devices to a subsurface level in said well, holding the devices stationary to permit the re-establishment of the flow of fluid and independently measuring the static pressure at substantially said level and independently measuring the velocity head of the moving fluid at substantially said level, moving said instruments to a subsurface level in said well vertically displaced from said first mentioned level, again holding said instruments stationary to again permit the re-establishment of the flow of fluid and again measuring the static pressure at said second mentioned level and the velocity head of said fluid at said second mentioned level, and from said measurements determining the rate of flow of fluid in said well.

LAWRENCE S. CHAMBERS.

CERTIFICATE OF CORRECTION.

Patent No. 2,348,192.   May 9, 1944.

LAWRENCE S. CHAMBERS.

It is hereby certified that error appears in the printed specification of the above numbered patent requiring correction as follows: Page 3, second column, line 37, after the word and period "depends." insert the following sentence -

--The pressure transmitting tube 19 connects the upper portion of chamber 16 with the lower portion of chamber 24.--;

page 9, first column, line 25, claim 3, for "lever" read --level--; and that the said Letters Patent should be read with this correction therein that the same may conform to the record of the case in the Patent Office.

Signed and sealed this 25th day of July, A. D. 1944.

Leslie Frazer

Acting Commissioner of Patents.

(Seal)